Patented June 24, 1930

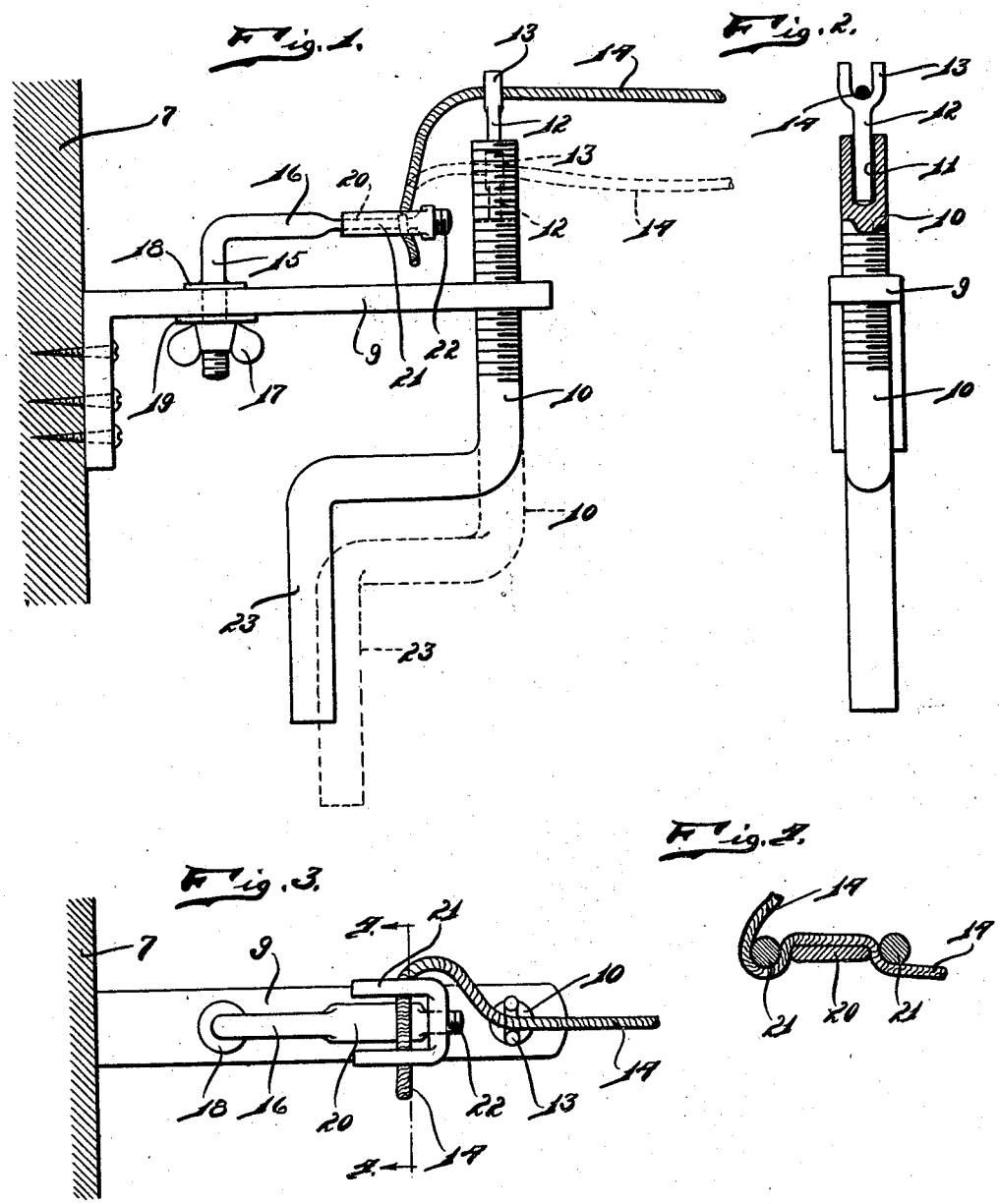

1,766,122

UNITED STATES PATENT OFFICE

MICHAEL HALEY, OF WEST BRANCH, MICHIGAN

ROPE STRETCHER

Application filed March 29, 1929. Serial No. 350,914.

My invention relates to a new and useful improvement in a rope stretcher adapted for use particularly in stretching lines which are desired to be retained in a taut condition.

The invention has for its object the provision of a device of this class which will be simple in structure, economical of manufacture and highly efficient in use.

Another object of the invention is the provision of a rope fastener which is adjustable to a high degree so as to adapt it for varying the tautness of a rope or other flexible line to a considerable degree.

Other objects will appear hereinafter.

The invention will be best understood by a reference to the accompanying drawings which form a part of this specification and in which, Fig. 1 is a side elevational view of the invention.

Fig. 2 is a front elevational view of the invention with a part broken away.

Fig. 3 is a top plan view of the invention.

Fig. 4 is a view taken on line 4—4 of Fig. 3.

In the drawings I have illustrated the invention supported on a suitable support 7. An L-shaped bracket having a horizontally disposed portion 9 is secured on the support. Threaded through the outer end of the L-shaped bracket is an adjustable member 10 having a socket 11 formed in its upper end in which is adapted to loosely engage the tree 12 of the yoke 13 which is adapted to engage the line 14 which is to be stretched or rendered taut. One end of the line 14 is usually fastened to a fixed support and the loose end is projected over the yoke 13. Projected through the horizontal portion 9 is a vertically extending rod portion 15 having a horizontally extended portion 16. A wing nut 17 is threaded on the portion 15 and suitable washers 18 and 19 are used. The horizontally disposed portion 16 has a flattened portion 20 which is adapted to engage the rope 14 and serve as a base against which the same may be clamped, by the clamping member 21 which is threaded on the threaded neck 22 projecting outwardly from the portion 20.

In operation, the rope or line 14 will be drawn over the yoke 13 and passed between the arms of the yoke 21 and the portion 20 as illustrated in Fig. 3. The crank 23 may then be used to rotate the threaded member 10 so as to raise the yoke 13 and thus stretch the line to the desired degree of tautness.

The construction is such that it may very easily and quickly be operated with little effort, because of the threaded member which is used for stretching purposes.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A rope stretcher of the class described comprising: a suporting member; a threaded member having a socket formed in its upper end, said threaded member being vertically extended and threaded through said supporting member; a rope engaging member loosely carried on the upper end of said threaded member; a crank on the lower end of said threaded member for effecting its rotation; and a clamping member carried by said supporting member for clamping the free end of said rope.

2. A rope stretcher of the class described comprising: a supporting member; a threaded member having a socket formed in its upper end, said threaded member being vertically extended and threaded through said supporting member; a rope engaging member loosely carried on the upper end of said threaded member; a crank on the lower end of said threaded member for effecting its rotation, a horizontally disposed member mounted on said supporting member having a flattened portion; and a clamping yoke cooperating with said flattened portion for clamping the rope thereagainst.

In testimony whereof I have signed the foregoing specification.

MICHAEL HALEY.